(12) United States Patent
Endo et al.

(10) Patent No.: US 10,259,335 B2
(45) Date of Patent: Apr. 16, 2019

(54) ENERGY MANAGEMENT CONTROLLER, ENERGY MANAGEMENT SYSTEM, CHARGE/DISCHARGE CONTROL METHOD AND PROGRAM

(71) Applicant: Mitsubishi Electric Corporation, Tokyo (JP)

(72) Inventors: Satoshi Endo, Tokyo (JP); Hirotoshi Yano, Tokyo (JP); Masaaki Yabe, Tokyo (JP); Satoshi Minezawa, Tokyo (JP); Ichiro Maruyama, Tokyo (JP); Yuki Ogawa, Tokyo (JP); Kaori Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 97 days.

(21) Appl. No.: 15/121,852

(22) PCT Filed: Apr. 18, 2014

(86) PCT No.: PCT/JP2014/061018
§ 371 (c)(1),
(2) Date: Aug. 26, 2016

(87) PCT Pub. No.: WO2015/159421
PCT Pub. Date: Oct. 22, 2015

(65) Prior Publication Data
US 2017/0008416 A1    Jan. 12, 2017

(51) Int. Cl.
*H02J 7/00* (2006.01)
*B60L 11/18* (2006.01)
*H02J 3/38* (2006.01)

(52) U.S. Cl.
CPC ....... *B60L 11/1861* (2013.01); *B60L 11/1844* (2013.01); *H02J 3/383* (2013.01);
(Continued)

(58) Field of Classification Search
CPC .................................................. B60L 11/1816
(Continued)

(56) References Cited

U.S. PATENT DOCUMENTS 8,330,415 B2 * 12/2012 Sato ......................... B60L 3/12
180/65.29
9,026,347 B2 * 5/2015 Gadh ................. B60L 11/1842
320/109
(Continued)

FOREIGN PATENT DOCUMENTS

JP     2008-054439 A    3/2008
JP     2009-284586 A    12/2009
(Continued)

OTHER PUBLICATIONS

Extended EP Search Report dated Dec. 8, 2017 issued in corresponding EP patent application 14889215.1.
(Continued)

*Primary Examiner* — Nathaniel R Pelton
*Assistant Examiner* — Tessema Kebede
(74) *Attorney, Agent, or Firm* — Posz Law Group, PLC

(57) ABSTRACT

An energy management system includes an energy management controller and a power conditioning system that charges and discharges a storage battery installed in an electric vehicle. The energy management controller includes: a charge/discharge controller that is configured to, in accordance with an operation mode having an operation right among a plurality of operation modes, control charging and discharging of the storage battery through the power conditioning system; and an operation right granter that is configured to determine an operation mode to which the operation right is to be granted next based on a predetermined transition condition, and to grant the operation right to the operation mode determined thereby.

17 Claims, 7 Drawing Sheets

(52) U.S. Cl.
CPC ............ *H02J 7/007* (2013.01); *Y02E 10/563* (2013.01); *Y02E 60/721* (2013.01); *Y04S 10/126* (2013.01)

(58) Field of Classification Search
USPC ........................................................ 320/109
See application file for complete search history.

(56) References Cited

U.S. PATENT DOCUMENTS

| | | | |
|---|---|---|---|
| 2009/0192655 A1* | 7/2009 | Ichikawa ............ | B60L 11/1811 700/291 |
| 2010/0017249 A1* | 1/2010 | Fincham .................. | B60L 3/12 705/412 |
| 2010/0094496 A1* | 4/2010 | Hershkovitz ............ | B60L 3/12 701/22 |
| 2010/0164439 A1 | 7/2010 | Ido | |
| 2011/0191220 A1* | 8/2011 | Kidston ................. | G06Q 30/04 705/34 |
| 2011/0204720 A1* | 8/2011 | Ruiz .................. | B60L 11/1816 307/66 |
| 2011/0258112 A1 | 10/2011 | Eder et al. | |
| 2012/0249065 A1* | 10/2012 | Bissonette ............ | B60L 11/184 320/109 |
| 2014/0139188 A1* | 5/2014 | Yonezawa ............. | H02J 7/0021 320/134 |
| 2014/0340075 A1* | 11/2014 | Doi ........................ | G01D 4/002 324/113 |

FOREIGN PATENT DOCUMENTS

| | | |
|---|---|---|
| JP | 2010-154646 A | 7/2010 |
| JP | 2011-151896 A | 8/2011 |
| JP | 2011-166974 A | 8/2011 |
| JP | 2012-005168 A | 1/2012 |
| JP | 2013-183588 A | 9/2013 |
| WO | 2012/134495 A1 | 10/2012 |
| WO | 2014/002205 A1 | 1/2014 |

OTHER PUBLICATIONS

Office Action dated Jun. 20, 2017 issued in corresponding JP patent application No. 2016-513592 (and partial English translation).
Office Action dated Mar. 28, 2017 issued in corresponding JP application No. 2016-513592 (and partial English translation).
Office Action dated Sep. 5, 2017 issued in corresponding JP patent application No. 2016-513592 (and partial English translation).
Office Action dated Apr. 25, 2018 issued in corresponding CN patent application No. 201480078086.8 (and English translation).
International Search Report of the International Searching Authority dated Jul. 8, 2014 for the corresponding international application No. PCT/JP2014/061018 (and English translation).
Office Action dated Nov. 15, 2018 issued in corresponding CN patent application No. 201480078086.8 (and English translation).
Office Action dated Nov. 30, 2018 issued in corresponding EP patent application No. 14889215.1.

* cited by examiner

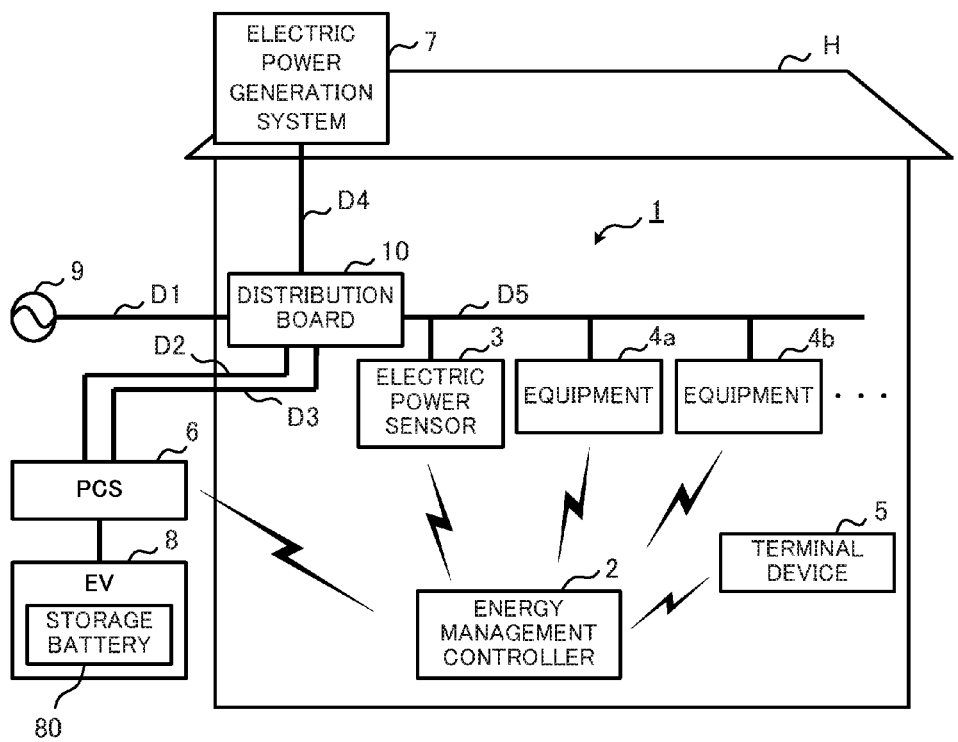
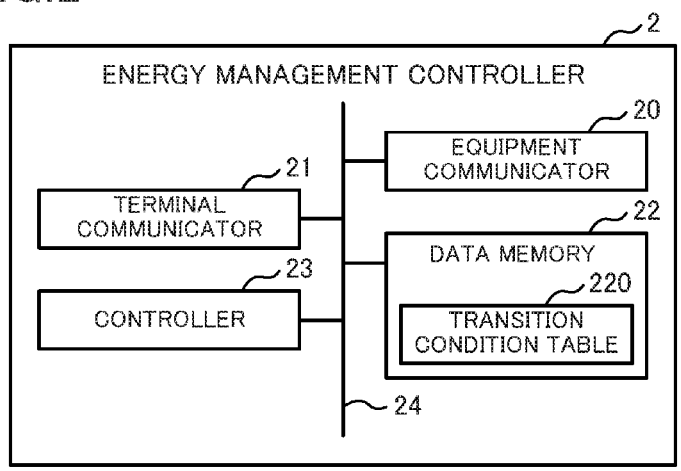

FIG.3

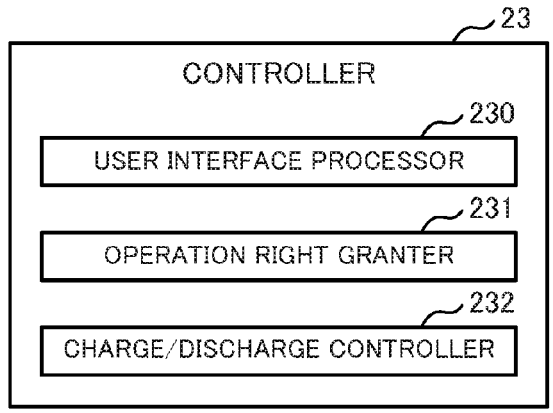

FIG.4

| NAME OF PLAN | CONTENT |
|---|---|
| MAXIMUM ELECTRICITY SALES PLAN | DURING LATE-NIGHT TIME SLOT, CHARGE STORAGE BATTERY. DURING DAYTIME TIME SLOT, DISCHARGE STORAGE BATTERY WHEN ELECTRIC POWER GENERATION IS LESS THAN HOME ELECTRIC POWER CONSUMPTION, AND SELL ELECTRICITY WHEN ELECTRIC POWER GENERATION IS LARGER THAN HOME ELECTRIC POWER CONSUMPTION. |
| MINIMUM ELECTRICITY PURCHASE PLAN | DURING LATE-NIGHT TIME SLOT, CHARGE STORAGE BATTERY. DURING DAYTIME TIME SLOT, DISCHARGE STORAGE BATTERY WHEN ELECTRIC POWER GENERATION IS LESS THAN HOME ELECTRIC POWER CONSUMPTION, AND CHARGE STORAGE BATTERY WHEN ELECTRIC POWER GENERATION IS LARGER THAN HOME ELECTRIC POWER CONSUMPTION. |
| DAYTIME OUTING PLAN | DURING LATE-NIGHT TIME SLOT, CHARGE STORAGE BATTERY. DURING DAYTIME TIME SLOT, DO NOT CHARGE AND DISCHARGE STORAGE BATTERY. |
| STEADY CHARGING PLAN | ALL DAY, ALWAYS CHARGE STORAGE BATTERY WHEN CHARGING IS POSSIBLE. |
| USER-DEFINED PLAN | CHARGE OR DISCHARGE STORAGE BATTERY ACCORDING TO SCHEDULE SET AS DESIRED BY USER. |
| STOP | ALL DAY, DO NOT CHARGE AND DISCHARGE STORAGE BATTERY. |

FIG.5

| OPERATION MODE HAVING OPERATION RIGHT | TRANSITION CONDITION | OPERATION MODE TO BE GRANTED NEXT |
|---|---|---|
| MANUAL OPERATION MODE | SATISFACTION OF CONDITION A OR B | PLAN OPERATION MODE |
| MANUAL OPERATION MODE | SATISFACTION OF CONDITION C | CALENDAR OPERATION MODE |
| PLAN OPERATION MODE | SATISFACTION OF CONDITION D | MANUAL OPERATION MODE |
| PLAN OPERATION MODE | SATISFACTION OF CONDITION E | CALENDAR OPERATION MODE |
| CALENDAR OPERATION MODE | SATISFACTION OF CONDITION D | MANUAL OPERATION MODE |
| CALENDAR OPERATION MODE | SATISFACTION OF CONDITION A OR F | PLAN OPERATION MODE |

CONDITION A: THERE IS RESTART OF OPERATION IN ACCORDANCE WITH CHARGE/DISCHARGE PLAN.

CONDITION B: EV AND PCS ARE NOT INTERCONNECTED, AND CURRENT TIME IS NOT WITHIN ADVANCED CHARGE TIME PERIOD.

CONDITION C: EV AND PCS ARE NOT INTERCONNECTED, AND CURRENT TIME IS WITHIN ADVANCED CHARGE TIME PERIOD.

CONDITION D: EV AND PCS ARE INTERCONNECTED, AND THERE IS OPERATION OF STARTING/STOPPING OF CHARGING OR OPERATION OF STARTING/STOPPING OF DISCHARGING.

CONDITION E: ADVANCED CHARGE START TIME.

CONDITION F: CANCELATION OF RECORDED EVENT.

FIG.9

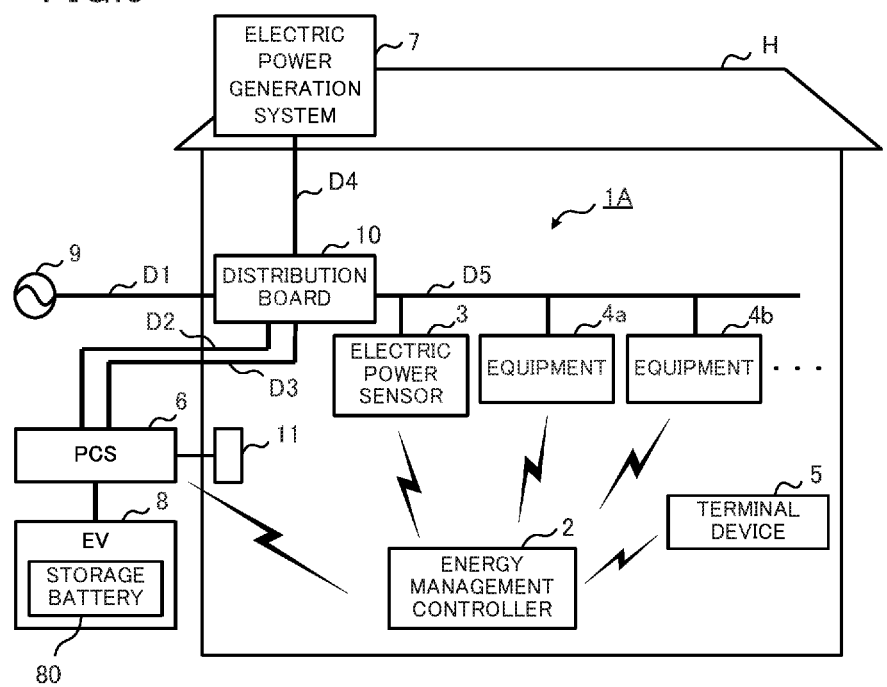

FIG.10

| CONDITION NO. | PRIORITY RIGHT ACQUISITION CONDITION |
|---|---|
| 1 | THERE IS RESTART OF OPERATION IN ACCORDANCE WITH CHARGE/DISCHARGE PLAN. |
| 2 | EV AND PCS BECAME DISCONNECTED. |
| 3 | FIRST CONTROL COMMAND AFTER TRANSFER OF OPERATION RIGHT TO PLAN OPERATION MODE. |
| 4 | EV AND PCS ARE INTERCONNECTED, AND THERE IS OPERATION OF STARTING/STOPPING OF CHARGING OR OPERATION OF STARTING/STOPPING OF DISCHARGING. |
| 5 | FIRST CONTROL COMMAND AFTER TRANSFER OF OPERATION RIGHT TO CALENDAR OPERATION MODE. |

ENERGY MANAGEMENT CONTROLLER, ENERGY MANAGEMENT SYSTEM, CHARGE/DISCHARGE CONTROL METHOD AND PROGRAM

CROSS REFERENCE TO RELATED APPLICATION

This application is a U.S. national stage application of International Patent Application No. PCT/JP2014/061018 filed on Apr. 18, 2014, the disclosure of which is incorporated herein by reference.

TECHNICAL FIELD

The present disclosure relates to an energy management controller, an energy management system, a charging and discharging control method and a program.

BACKGROUND ART

Electric vehicles using electricity as the source of power are in widespread use. A user can charge a storage battery installed in the electric vehicle, for example, by using charging equipment located at the residence of the user. Patent Literature 1 teaches a device, capable of scheduled charging of a storage battery during charging of an electric vehicle.

Meanwhile, home energy management systems (HEMSs) are in wide use for control of the supply of electric power to home electric equipment. More stable and economical supply of electric power becomes possible by combination of the electric vehicle with the HEMS, and rather than just increasing convenience of the electric vehicle for the user, such combined use is also anticipated to increase reliability of the HEMS.

CITATION LIST

Patent Literature

Patent Literature 1: Unexamined Japanese Patent Application Kokai Publication No. 2010-154646

SUMMARY OF INVENTION

Technical Problem

Although advances are occurring in HEMS technology for the appropriate control of operation of home electric equipment according to the life activities of the user, no effective proposal has been presented concerning technology for, according to life activities of the user, appropriate charging and discharging of a storage battery installed in an electric vehicle.

The object of the present disclosure is to solve the aforementioned problem by providing an energy management controller and the like for, in a manner appropriate for life activities of the user, control of charging and discharging of the storage battery installed in the electric vehicle.

Solution to Problem

In order to achieve the aforementioned object, the energy management controller according to the present disclosure includes:

a charge/discharge controller configured to, in accordance with an operation mode having an operation right among a plurality of operation modes, control charging and discharging of a storage battery through a power conditioning system that charges and discharges the storage battery, the storage battery being installed in an electric vehicle; and an operation right granter configured to determine an operation mode to which the operation right is to be granted next based on a predetermined transition condition, and to grant the operation right to the operation mode determined thereby.

Advantageous Effects of Invention

According to the present disclosure, appropriate charging and discharging of a storage battery installed in an electric vehicle is enabled according to life activities of the user. Thus efficient use of the storage battery is enabled, and convenience for the user improves.

BRIEF DESCRIPTION OF DRAWINGS

FIG. 1 is a diagram showing an overall configuration of an energy management system according to Embodiment 1 of the present disclosure;

FIG. 2 is a block diagram showing a configuration of an energy management controller of Embodiment 1;

FIG. 3 is diagram showing a functional configuration of a controller included in the energy management controller of Embodiment 1;

FIG. 4 is a diagram showing an example of charge/discharge plans;

FIG. 5 is a diagram showing an example of a transition condition table;

FIG. 9 is a diagram showing an overall configuration of an energy management system according to Embodiment 2 of the present disclosure; and FIG. 10 is a diagram showing an example of priority right acquisition conditions in Embodiment 2.

DESCRIPTION OF EMBODIMENTS

Figure 6:
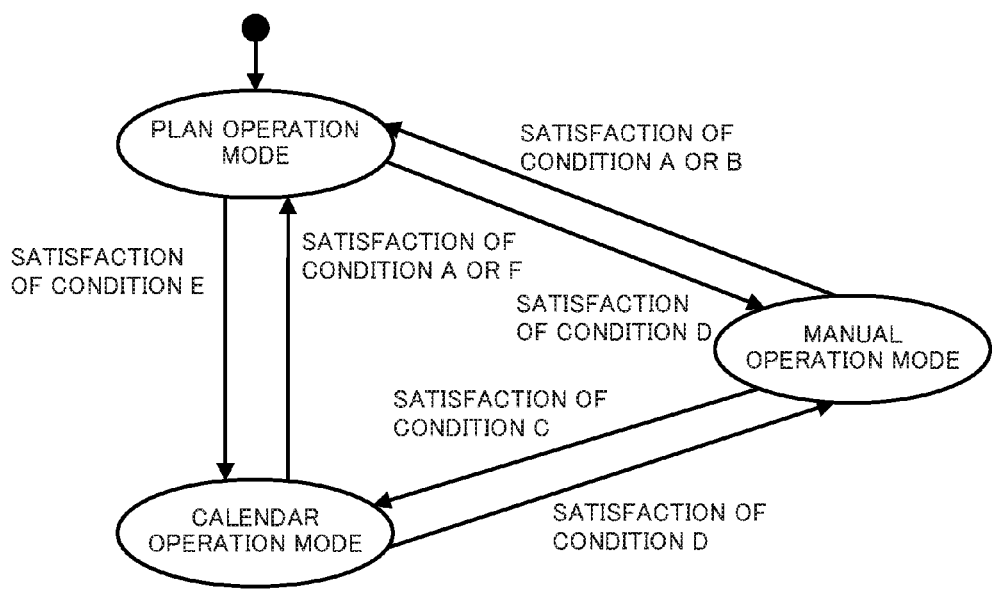
FIG. 6 is a schematic diagram showing content of the transition condition table of FIG. 5.

Embodiments of the present disclosure are described below in detail in reference to figures.

Embodiment 1

FIG. 1 is a diagram showing an overall configuration of an energy management system 1 according to Embodiment 1 of the present disclosure. This energy management system 1 is a so-called home energy management system (HEMS) for managing electric power used in a general residence. The energy management system 1 includes an energy management controller 2, an electric power sensor 3, equipment 4 (such as equipment 4a, 4b), a terminal device 5, a power conditioning system (referred to hereinafter as PCS) 6 and an electric power generation system 7.

The electric power sensor 3 measures the amount of electric power consumed at the residence (consumption site). The electric power sensor 3 is connected through a wireless network (not illustrated) constructed in a home H to enable communication with the energy management controller 2. This wireless network is based on a communication protocol such as ECHONET Lite. The electric power sensor 3 sends data relating to the measured electric power amount to the energy management controller 2.

The equipment 4 (equipment 4a, 4b and the like) is electrical equipment installed within the home H, such as a lighting apparatus, an air conditioner, a refrigerator, an induction heating cooker, a rice cooker, a microwave oven and a floor heating system. Each article of the equipment 4 is connected to an electric power line D5 for supply of electric power from a commercial power supply 9 and the like. Each article of equipment 4 is connected to the energy management controller 2 in a manner so as to enable communication through the aforementioned non-illustrated wireless network.

The PCS 6 is a power conditioning system for an electric vehicle (referred to hereinafter as EV) 8. The PCS 6 charges and discharges a storage battery 80 installed in the EV 8. The electric power from the commercial power supply 9 and the like is supplied to the PCS 6 through an electric power line D1, a distribution board 10 and an electric power line D2. The PCS 6 supplies electric power from the commercial power supply 9 and the like to the storage battery 80 during charging of the storage battery 80. Moreover, during discharge of the storage battery 80, the PCS 6 supplies electric power from the storage battery 80 through an electric power line D3 to the distribution board 10. The PCS 6 is connected to the energy management controller 2 so as to enable communication through the aforementioned wireless network. Furthermore, the communication between the PCS 6 and the energy management controller 2 may be performed through a LAN cable.

The electric power generation system 7 includes unillustrated photovoltaic panels (PV panels) and a power conditioner. The electric power generation system 7 performs DC electric power to AC electric power conversion of electric power generated by the PV panels and supplies the converted AC electric power through an electric power line D4 to the distribution board 10.

The terminal device 5 is a mobile communication device having a display function, such as a tablet-type personal computer and a smart phone. The terminal device 5 performs data communication with the energy management controller 2 based on a widely-known wireless LAN standard, such as Wi-Fi (registered trademark). The terminal device 5 functions as an interface (user interface) between the energy management system 1 and the user, who is a resident of the home H.

The energy management controller 2 is arranged at a suitable location in the home H and performs monitoring of the amount of electric power consumption in the home. Moreover, the energy management controller 2 performs operation control, monitoring of the operation state and the like of each article of the equipment 4. Furthermore, through the PCS 6, the energy management controller 2 controls charging and discharging of the storage battery 80.

As shown in FIG. 2, the energy management controller 2 includes an equipment communicator 20 for communication with each article of the equipment 4 and the like, a terminal communicator 21 for communication with the terminal device 5, a data memory 22 for storing a program and data, and a controller 23 for controlling these components. The components of the energy management controller 2 are each mutually interconnected through a bus 24.

The equipment communicator 20 includes, for example, a communication interface such as a wireless LAN card, and under control of the controller 23, performs wireless data communication with the electric power sensor 3, each article of equipment 4 and the PCS 6.

The terminal communicator 21 includes a predetermined short-range wireless communication interface, and under control of the controller 23, performs data communication, for example, based on a widely known wireless LAN standard, such as Wi-Fi (registered trademark), with the terminal device 5.

The data memory 22, for example, includes a readable/writable nonvolatile semiconductor memory such as a flash memory. The data memory 22 stores a below-described transition condition table 220. Moreover, the data memory 22 stores a non-illustrated program for control of charging and discharging of the storage battery 80, and also stores non-illustrated data used for execution of the program. The data memory 22 also stores a program for monitoring the electric power consumption amount within the home, a program for control of operation of each article of the equipment 4, and data used during execution of such programs.

The controller 23 includes a central processing unit (CPU), read only memory (ROM), random access memory (RAM) and the like (all non-illustrated), and performs overall control of the energy management controller 2. As shown in FIG. 3, the controller 23, as functions specific to the present disclosure, includes a user interface processor 230, an operation right granter 231 and a charge/discharge controller 232. The functions of these components are performed by the CPU and the like executing programs, for controlling charge and discharge, stored in the data memory 22.

The user interface processor 230 performs user interface processing through the terminal device 5. That is to say, through the user terminal device 5, the user interface processor 230 receives an operation from the user, and performs processing according to contents of the received operation. Moreover, the user interface processor 230 sends to the terminal device 5 information to be provided to the user, such as monitoring screen data, and performs processing in order to make the terminal device 5 display such information.

Based on the transition condition table 220, the operation right granter 231 determines which operation mode is to be next granted the operation right, and grants the operation right to the determined operation mode. The "operation right" is a right to operate the PCS 6, and the only control commands transmitted to the PCS 6 are those control commands that are based on the operation mode granted the operation right. In the present embodiment, "operation mode" means the processing mode in the charge and discharge control of the storage battery 80. In the present embodiment, there are three operation modes: a manual operation mode, a plan operation mode and a calendar operation mode.

According to the manual operation mode, charge and discharge control of the storage battery 80 is performed based on user operation through the terminal device 5. Examples of such operation include operations commanding the starting/stopping of charging, operations commanding the starting/stopping of discharging of the storage battery 80, and the like.

According to the plan operation mode, charge and discharge control of the storage battery 80 is performed based on one charge/discharge plan among a plurality of charge/ discharge plans set beforehand by the user. An example of the charge/discharge plans is shown in FIG. 4. In FIG. 4, the expression "late-night time slot" refers to a time slot in which the electricity price becomes comparatively inexpensive according to an electricity pricing plan provided by an electric power company. The expression "daytime time slot" refers to a time slot that occurs outside the "late-night time slot".

The energy management controller 2 has a calendar recording function, and according to the calendar operation mode, charge control of the storage battery 80 is performed based on user content recorded using the calendar recording function. The expression "calendar recording function" refers to a function for, based on events previously recorded by the user and start times of such events, enabling operations such as controlling operation of the corresponding equipment 4 and charging of the storage battery 80. Here, the term "event" includes "outing (with the electric vehicle)", "outing (without the electric vehicle)", "returning home" and the like. For example, when the user performs calendar recording of the content "outing (with the electric vehicle)" and "10:00", the energy management controller 2 controls the PCS 6 so as to complete charging of the storage battery 80 by 10 o'clock AM.

FIG. 5 shows contents of the transition condition table 220 of the present embodiment. The transition condition table 220 is a data table that records multiple records associated with the operation mode presently having the operation right, transition conditions, and the operation mode to be granted the operation right next upon satisfaction of the transition condition.

According to the transition condition table 220 shown in FIG. 5, for example, when the manual operation mode presently has the operation right, upon satisfaction of condition A or condition B, the operation right transfers to the plan operation mode. Here, condition A indicates performing an operation ordered by the user for restarting of running based on the aforementioned charge/discharge plan, and condition B indicates that the EV 8 and the PCS 6 are not interconnected, and that the current time is not within an advanced charge time period. The term "advanced charge time period" refers to the charge time period of the storage battery 80 that occurs in the aforementioned calendar operation mode.

Moreover, if the manual operation mode presently has the operation right, according to the transition condition table 220 shown in FIG. 5, the operation right transfers to the calendar operation mode upon satisfaction of condition C. Here, the condition C indicates a condition under which the EV 8 is not interconnected to the PCS 6, and which occurs during the advanced charge time period.

Moreover, according to the transition condition table 220 indicated in FIG. 5, if the plan operation mode presently has the operation right, then the operation right is shown as transferring to the manual operation mode upon satisfaction of the condition D, and the operation right is shown as transferring to the calendar operation mode upon satisfaction of the condition E. Here, the condition D indicates that the EV 8 is connected to the PCS 6, and that the user, through the terminal device 5, has performed an operation commanding the starting/stopping of charging, or the starting/stopping of discharging, of the storage battery 80. Moreover, the condition E indicates that the present time has become an advanced charge start time. The term "advanced charge start time" refers to the time at which charging of the storage battery 80 starts.

Moreover, when the calendar operation mode has the operation right, the operation right is indicated to transfer to the manual operation mode upon satisfaction of the condition D, and the operation right is indicated to transfer to the plan operation mode upon satisfaction of the condition A or a condition F. Here, the condition F indicates satisfaction of cancelation (including revision) by the user of an event recorded by the aforementioned calendar recording function.

FIG. 6 shows schematically contents of the transition condition table 220 shown in FIG. 5.

The charge/discharge controller 232 performs charge and discharge control of the storage battery 80 through the PCS 6 according to which one of the operation modes has the operation right among the manual operation mode, plan operation mode and calendar operation mode.

Figure 7:
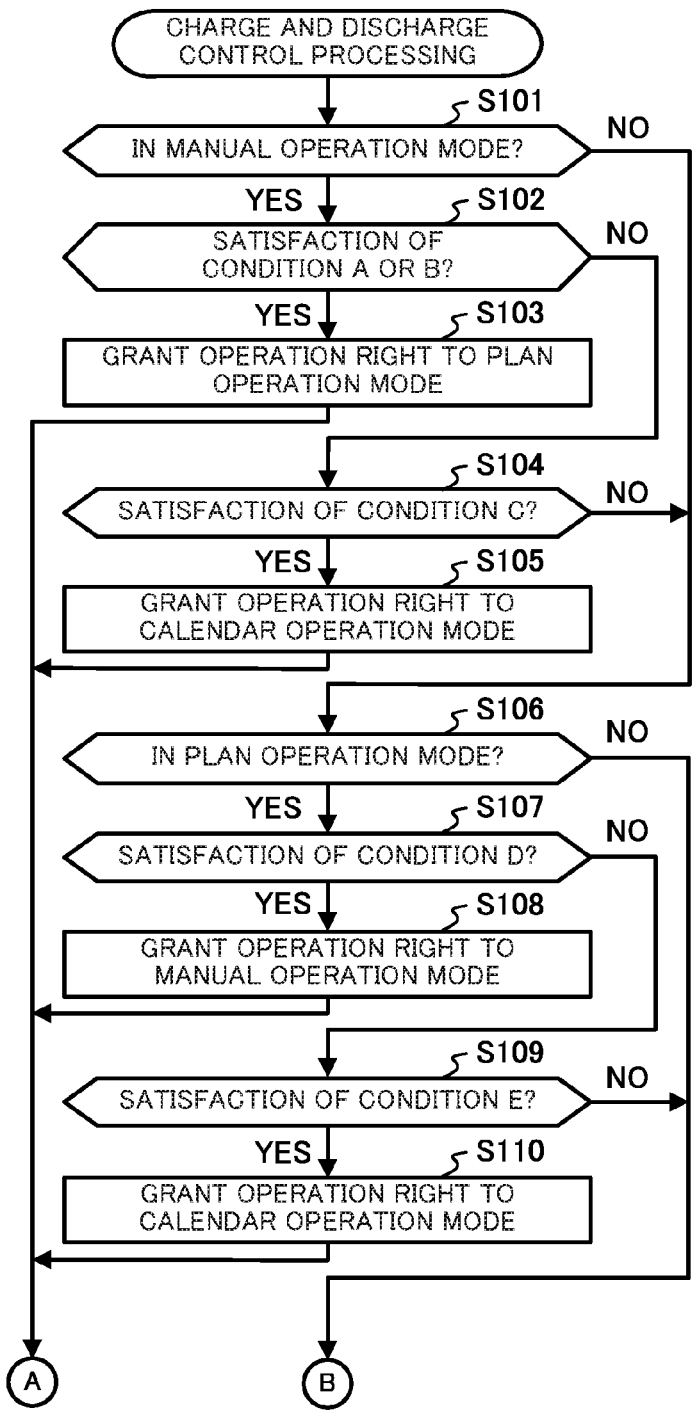
FIG. 7 is a flowchart (first part) showing a procedure of a charge and discharge control processing of Embodiment 1.
Figure 8:
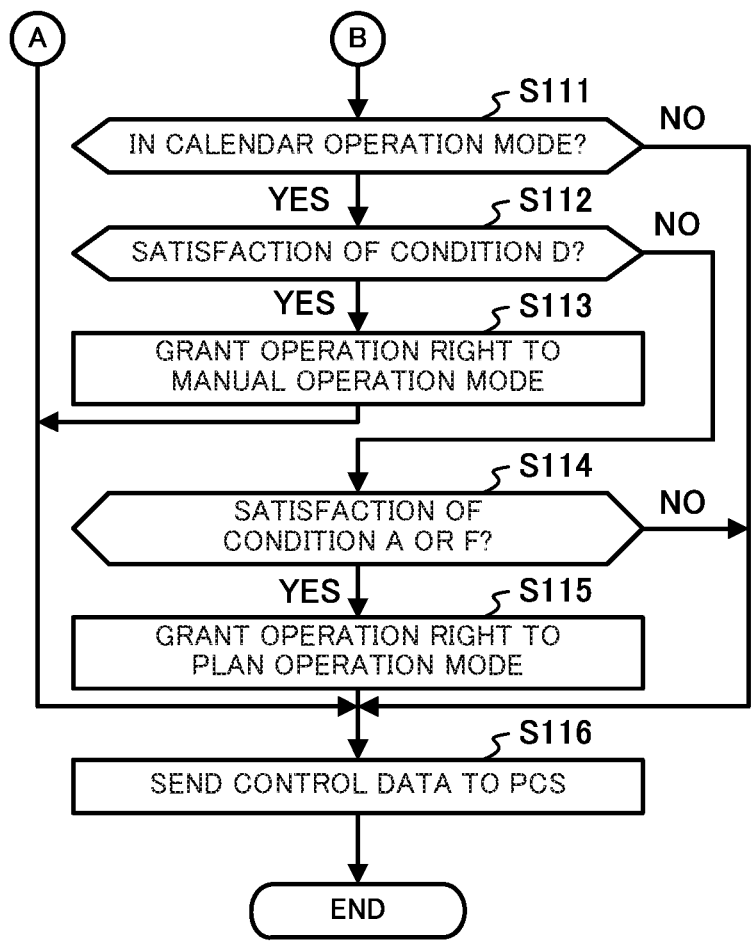
FIG. 8 is a flowchart (second part) showing a procedure of a charge and discharge control processing of Embodiment 1.

FIGS. 7 and 8 are flow charts showing a procedure of a processing (a charge and discharge control processing), executed by the controller 23 of the energy management controller 2, to control charge and discharge of the storage battery 80. This charge and discharge control processing is executed repeatedly at a predetermined cycle.

The operation right granter 231 performs determination of the manual operation mode that is presently granted the operation right. When the result of the determination is that the manual mode has the operation right (YES in step S101), the operation right granter 231 determines whether there is satisfaction of the condition A or condition B of the transition condition table 220 (step S102). If there is the satisfaction of the condition A or the condition B (YES in step S102), the operation right granter 231 takes the operation right from the manual operation mode and grants the operation right to the plan operation mode (step S103). Thereafter, the controller 23 proceeds to the processing of step S116.

If the result of step S102 is NO, then the operation right granter 231 determines whether there is satisfaction of the condition C of the transition condition table 220 (step S104). If there is the satisfaction of the condition C (YES in step S104), the operation right granter 231 takes the operation right from the manual operation mode and grants the operation right to the calendar operation mode (step S105). The controller 23 thereafter proceeds to the processing of step S116.

If the plan operation mode has the operation right (YES in step S106), then the operation right granter 231 determines whether there is satisfaction of the condition D of the transition condition table 220 (step S107). If there is the satisfaction of the condition D (YES in step S107), then the operation right granter 231 takes the operation right from the plan operation mode and grants the operation right to the manual operation mode (step S108). The controller 23 thereafter proceeds to the processing of step S116.

If the result of step S107 is NO, then the operation right granter 231 determines whether there is satisfaction of the condition E of the transition condition table 220 (step S109). If there is the satisfaction of the condition E (YES in step S109), then the operation right granter 231 takes the operation right from the plan operation mode and grants the operation right to the calendar operation mode (step S110). Thereafter, the controller 23 proceeds to the processing of step S116.

If the calendar operation mode has the operation right (YES in step S111 of FIG. 8), then the operation right granter 231 determines whether there is satisfaction of the condition D of the transition condition table 220 (step S112). If there is the satisfaction of the condition D (YES in step S112), then the operation right granter 231 takes the operation right from the calendar operation mode and grants the operation right to the manual operation mode (step S113). Thereafter, the controller 23 proceeds to the processing of step S116.

If the result of step S112 is NO, then the operation right granter 231 determines whether there is satisfaction of the condition A or condition F of the transition condition table 220 (step S114). If there is the satisfaction of the condition A or condition F (YES in step S114), the operation right granter 231 takes the operation right from the calendar operation mode and grants the operation right to the plan operation mode (step S115).

In step S116, the charge/discharge controller 232 performs control of charging and discharging of the storage battery 80 through the PCS 6 based on the operation mode that has the operation right. Specifically, data (control data) indicating control commands based on the operation mode that has the operation right are sent to the PCS 6.

As described above, according to the energy management system 1 according to Embodiment 1 of the present disclosure, charge and discharge control of the storage battery 80 installed in the EV 8 is performed by an energy management controller 2 equivalent to the so-called HEMS controller. Further, the energy management controller 2 performs multiple forms of automatic control (that is, the plan operation mode and the calendar operation mode) rather than just performing control (the manual operation mode) according to the user operation commanding through the terminal device 5 the starting/stopping of charging or the starting/stopping of discharging of the storage battery 80. This enables appropriate charging and discharging of the storage battery 80 of the EV 8 according to the life activity of the user living in the home H. This enables efficient use of the storage battery 80, and convenience of the user increases.

Further, in order to prevent conflicting control by the aforementioned plurality of operation modes, the energy management controller 2 performs charge and discharge control according to the operation mode that has the operation right, appropriately determines the operation mode to be next granted the operation right based on the transition condition table 220, and grants the operation right to the determined operation mode. Thus appropriate and smooth switching of the operation mode that has the operation right, that is, the method of control of charging and discharging of the storage battery 80, is enabled, thus allowing for efficient performance of charging and discharging of the storage battery 80 as needed by the user.

Further, in a modified aspect of the present embodiment, the controller 23 has a function that combines the operation right granter 231 and the charge/discharge controller 232. That is to say, in the same manner as the aforementioned function of the operation right granter 231, based on the transition condition table 220, the charge/discharge controller 232 may determine the operation mode to be granted next the right to operate the PCS 6, and may control charge and discharge of the storage battery 80 through the PCS 6 according to the determined operation mode.

Embodiment 2

An energy management system of an Embodiment 2 of the present disclosure is described next. Further, components and the like that occur in common with the Embodiment 1 are assigned the same reference signs, and description of such elements is omitted.

FIG. 9 is a diagram showing an overall configuration of and energy management system 1A of Embodiment 2. According to this energy management system 1A, a PCS remote controller 11 is additionally provided that is connected by wired connection to the PCS 6 in the configuration of the energy management system 1 of Embodiment 1.

The PCS remote controller 11 is a remote controller for user operation of the PCS 6. The PCS remote controller 11 includes, for example, non-illustrated components such as an input device, which includes a touch panel and a touch pad; a display device, which includes a full-dot-type liquid crystal display (LCD) panel; and a microcomputer.

By operation of the PCS remote controller 11 the user can command the PCS 6 to stop/start charging or discharging of the storage battery 80. By the user operating the PCS remote controller 11 so as to select the desired automatic control type from among a plurality of automatic control types, execution is enabled of the automatic control type selected using the PCS remote controller 11.

According to the energy management system 1A of Embodiment 2 in this manner, charge and discharge control of the storage battery 80 is performed through the PCS 6 also using the PCS remote controller 11, rather than only using the energy management controller 2. Thus a means becomes desirable for resolving problems, such as decline of charge and discharge efficiency, that occur when conflict occurs between the control of the energy management controller 2 and the control of the PCS remote controller 11.

Thus according to the energy management system 1A of Embodiment 2, a specification is preset such that a control command is received by the PCS 6 from, among the two controllers (PCS remote controller 11 and energy management controller 2), the controller that has been granted a priority right to operate the PCS 6, and such that the control command is not received from the controller that has not been granted the priority right.

The PCS 6 manages which of the controllers, that is, the PCS remote controller 11 and the energy management controller 2, is acquiring the priority right. When the PCS 6 receives from the PCS remote controller 11 or the energy management controller 2 control data including information indicating priority right acquisition, the PCS 6 grants the priority right to the controller that is the source of the transmission of such control data.

The PCS remote controller 11 and the energy management controller 2 acquire the priority right according to a respective predetermined priority right acquisition condition.

In the present embodiment, the priority right acquisition condition of the PCS remote controller 11 is considered to be operation by the user. Specifically, when operated by the user, PCS remote controller 11 determines that the priority right acquisition condition is satisfied, and then issues an acquisition notification of the priority right to the PCS 6. More specifically, when control data based on a user operation is sent to the PCS 6, the PCS remote controller 11 stores information indicating priority right acquisition in the control data. The PCS 6, upon receiving this control data, grants the priority right to the PCS remote controller 11, and controls charging and discharging of the storage battery 80 according to the control command indicated by such control data.

On the other hand, the energy management controller 2 determines, based on priority right acquisition conditions defined as indicated in FIG. 10, whether or not priority right acquisition is a requirement. At a predetermined cycle, the controller 23 of the energy management controller 2 repeatedly executes a processing (a priority right acquisition requirement determination processing) to determine whether the priority right acquisition is a requirement. In the present embodiment, when the controller 23 initiates the aforementioned charge and discharge control processing (see FIGS. 7 and 8), the controller 23 firstly executes this priority right acquisition requirement determination processing.

During the priority right acquisition requirement determination processing, the controller 23 determines whether there is satisfaction of each of the plurality of priority right acquisition conditions defined as in FIG. 10. Then if there is the satisfaction of any of the priority right acquisition conditions, the controller 23 determines that priority right acquisition is a requirement.

If the priority right acquisition is a requirement, then the controller 23 issues the acquisition notification of the priority right to the PCS 6. More specifically, the control data transmitted by the controller 23 to the PCS 6 (see step S116 of FIG. 8) contains information indicating the priority right acquisition. Upon receiving this control data, the PCS 6, in addition to granting the priority right to the energy management controller 2, performs charge and discharge control of the storage battery 80 based on the control command indicated by such control data.

According to the energy management system 1A of Embodiment 2 of the present disclosure as in the above description, among the two controllers capable of control of the PCS 6 (PCS remote controller 11 and energy management controller 2), the PCS 6 receives the control command from only the controller that acquired the priority right based on the predetermined priority right acquisition conditions. This thus enables elimination of problems that would arise when conflict occurs between control commands from both of the controllers.

Furthermore, the present disclosure is not limited to each of the aforementioned embodiments, and naturally various types of modifications are possible within a scope that does not depart from the gist of the present disclosure.

For example, the energy management controller 2 may include an input device such as a keyboard, a mouse, keypad, a touchpad and a touch panel, and a display device such as a CRT display, a liquid crystal display, an organic EL display and a plasma display. Such configuration enables the user to directly input the operation concerning charge and discharge of the storage battery 80 to the energy management controller 2.

Moreover, according to the aforementioned Embodiment 2, there are two controllers capable of control of the PCS 6, that is, the PCS remote controller 11 and the energy management controller 2. However, of course, the number of controllers may be 3 or more.

Moreover, the energy management controller 2 or the PCS remote controller 11 may have a function of identifying the user. In the processing of granting the operation right or the priority right, a requirement of granting may be determined by additionally considering the rights (user authority) granted beforehand to each user. By this means, for example, a lower-tier user may be prohibited from revoking an operation of a higher-tier user.

Moreover, in each of the aforementioned embodiments, a program for execution by the energy management controller 2 may be stored and distributed in a computer-readable recording medium such as a compact disc read-only memory (CD-ROM), a digital versatile disc (DVD), a magneto-optical disk (MO), a universal serial bus (USB) memory and a memory card. By installation of this program in a dedicated or general-purpose computer, the computer can function as the energy management controller 2 of each of the aforementioned embodiments.

The above-described program may be stored on a disk device or the like of a server device on a communication network such as the Internet to enable the program to be downloaded to the computer, for example by superimposing the program onto a carrier wave. Moreover, the aforementioned processing can be achieved even by execution while the program is transferred through the communication network. Furthermore, the aforementioned processing can be achieved by executing all or part of the program on the server device, and executing the program while sending and receiving by the computer the information relating to such processing through the communication network.

Moreover, if the aforementioned functions are executed by sharing the functions between an operating system (OS) and application programs, or are executed by both the OS and the application programs in cooperation with each other, the non-OS portion alone may be stored and distributed in the aforementioned recording medium, or alternatively, may be, for example, downloaded to the computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure may be used with advantage for a system and the like for management of electric power used within a household.

REFERENCE SIGNS LIST 1, 1A Energy management system
2 Energy management controller
3 Electric power sensor
4a, 4b Equipment
5 Terminal device
6 PCS
7 Electric power generation system
8 EV
9 Commercial power supply
10 Distribution board
11 PCS remote controller
20 Equipment communicator
21 Terminal communicator
22 Data memory
23 Controller
24 Bus
80 Storage battery
220 Transition condition table
230 User interface processor
231 Operation right granter
232 Charge/discharge controller

The invention claimed is:
1. An energy management controller configured to be installed in a home, the energy management controller comprising:
 a charge/discharge controller configured to, in accordance with a current operation mode having an operation right among a plurality of operation modes, control charging and discharging of a storage battery through a power conditioning system that charges and discharges the storage battery, the storage battery being installed in an electric vehicle; and an operation right granter configured to perform a processing, at a predetermined cycle, of determining a next operation mode to which the operation right is to be granted next among the plurality of operation modes based on a transition condition that indicates a condition under which the operation right transfers among the plurality of operation modes to one another, and granting the operation right to the next operation mode determined by the operation right granter, wherein the plurality of operation modes comprises a plan operation mode, a calendar operation mode, and a manual operation mode, under the plan operation mode, charging and discharging of the storage battery are controlled based on a charge/discharge plan preliminarily set by a user among a plurality of charge/discharge plans, under the calendar operation mode, charging and discharging of the storage battery are controlled based on an event and a start time of the event that are prerecorded by the user using a calendar recording function, and under the manual operation mode, charging and discharging of the storage battery are controlled by an operation by the user for commanding starting or stopping of the charging of the storage battery or starting or stopping of the discharging of the storage battery.

2. The energy management controller according to claim 1, wherein the operation right granter is further configured to grant the operation right to the manual operation mode, upon performance of the manual operation by the user for control of charging and discharging of the storage battery, while the electric vehicle and the power conditioning system are interconnected.

3. The energy management controller according to claim 1, wherein the operation right granter is further configured to grant the operation right to the plan operation mode:
  upon restarting, by the user, of operation in accordance with the charge/discharge plan;
  upon cancelation, by the user, of an event that had been recorded by the calendar recording function; or
  when the electric vehicle and the power conditioning system are not interconnected, and a current time is not within a charge time period of the storage battery in the calendar operation mode.

4. The energy management controller according to claim 1, wherein the operation right granter is further configured to grant the operation right to the calendar operation mode:
  when the electric vehicle and the power conditioning system are not interconnected, and a current time is within a charge time period of the storage battery in the calendar operation mode; or
  upon the current time reaching a charge start time of the storage battery in the calendar operation mode.

5. An energy management controller configured to be installed in a home for control of charging and discharging of a storage battery through a power conditioning system that charges and discharges the storage battery, the storage battery being installed in an electric vehicle, the energy management controller comprising:

a charge/discharge controller configured to perform a processing, at a predetermined cycle, of granting an operation right to one operation mode based on a transition condition that indicates a condition under which the operation right transfers among a plurality of operation modes to one another, and control charging and discharging of the storage battery through the power conditioning system in accordance with the operation mode to which the operation right is granted, wherein the plurality of operation modes comprises a plan operation mode, a calendar operation mode, and a manual operation mode, under the plan operation mode, charging and discharging of the storage battery are controlled based on a charge/discharge plan preliminarily set by a user among a plurality of charge/discharge plans, under the calendar operation mode, charging and discharging of the storage battery are controlled based on an event and a start time of the event that are prerecorded by the user using a calendar recording function, and under the manual operation mode, charging and discharging of the storage battery are controlled by an operation by the user for commanding starting or stopping of the charging of the storage battery or starting or stopping of the discharging of the storage battery, and the charge/discharge controller is further configured to control charging and discharging of the storage battery in accordance with the calendar operation mode:
  when the electric vehicle and the power conditioning system are not interconnected, and a current time is within a charge time period of the storage battery in the calendar operation mode; or
  upon the current time reaching a charge start time of the storage battery in the calendar operation mode.

6. The energy management controller according to claim 5, wherein the charge/discharge controller is further configured to control charging and discharging of the storage battery in accordance with the manual operation mode, upon performance of the manual operation by the user for control of charging and discharging of the storage battery, while the electric vehicle and the power conditioning system are interconnected.

7. The energy management controller according to claim 5, wherein the charge/discharge controller is further configured to control charging and discharging of the storage battery in accordance with the plan operation mode:
  upon restarting, by the user, of operation in accordance with the charge/discharge plan;
  upon cancelation, by the user, of an event that had been recorded by the calendar recording function; or
  when the electric vehicle and the power conditioning system are not interconnected, and a current time is not within a charge time period of the storage battery in the calendar operation mode.

8. An energy management system, comprising:

an energy management controller configured to be installed in a home; and a power conditioning system configured to charge and discharge a storage battery installed in an electric vehicle, wherein the energy management controller comprises:
  a charge/discharge controller configured to, in accordance with a current operation mode having an operation right among a plurality of operation modes, control charging and discharging of the storage battery through the power conditioning system; and an operation right granter configured to perform a processing, at a predetermined cycle, of determining a next operation mode to which the operation right is to be granted next among the plurality of operation modes based on a transition condition that indicates a condition under which the operation right transfers among the plurality of operation modes to one another, and granting the operation right to the next operation mode determined by the operation right granter, wherein the plurality of operation modes comprises a plan operation mode, a calendar operation mode, and a manual operation mode, under the plan operation mode, charging and discharging of the storage battery are controlled based on a charge/discharge plan preliminarily set by a user among a plurality of charge/discharge plans, under the calendar operation mode, charging and discharging of the storage battery are controlled based on an event and a start time of the event that are pre-recorded by the user using a calendar recording function, and under the manual operation mode, charging and discharging of the storage battery are controlled by an operation by the user for commanding starting or stopping of the charging of the storage battery or starting or stopping of the discharging of the storage battery.

9. The energy management system according to claim 8, further comprising:

a second controller configured to control charging and discharging of the storage battery through the power conditioning system, wherein the power conditioning system is further configured to, among the energy management controller and the second controller, receive control commands only from the controller acquired a priority right.

10. The energy management system according to claim 9, wherein the power conditioning system is further configured to, upon receiving an acquisition notification of the priority right, grant the priority right to the controller that is a source of the acquisition notification;

the energy management controller is further configured to, upon satisfaction of a predetermined condition for the energy management controller to acquire the priority right, issue the acquisition notification of the priority right to the power conditioning system; and the second controller is further configured to, upon satisfaction of a predetermined condition for the second controller to acquire the priority right, issue the acquisition notification of the priority right to the power conditioning system.

11. A charging and discharging control method comprising:

based on a transition condition that indicates a condition under which an operation right transfers among a plurality of operation modes to one another, performing a processing, at a predetermined cycle, of determining, by an energy management controller configured to be installed in a home, a next operation mode to be next granted the operation right among the plurality of operation modes, and granting the operation right to the next operation mode determined by the energy management controller; and based on the operation mode having the operation right, controlling, by the energy management controller, charging and discharging of a storage battery through a power conditioning system that charges and discharges of the storage battery, the storage battery being installed in an electric vehicle, wherein the plurality of operation modes comprises a plan operation mode, a calendar operation mode, and a manual operation mode, under the plan operation mode, charging and discharging of the storage battery are controlled based on a charge/discharge plan preliminarily set by a user among a plurality of charge/discharge plans, under the calendar operation mode, charging and discharging of the storage battery are controlled based on an event and a start time of the event that are pre-recorded by the user using a calendar recording function, and under the manual operation mode, charging and discharging of the storage battery are controlled by an operation by the user for commanding starting or stopping of the charging of the storage battery or starting or stopping of the discharging of the storage battery.

12. A non-transitory computer-readable recording medium recording a program to cause a computer, configured to be installed in a home, to function as:

a charge/discharge controller configured to, in accordance with a current operation mode having an operation right among a plurality of operation modes, control charging and discharging of a storage battery through a power conditioning system that charges and discharges the storage battery, the storage battery being installed in an electric vehicle; and an operation right granter configured to perform a processing, at a predetermined cycle, of determining a next operation mode to which the operation right is to be granted next among the plurality of operation modes based on a transition condition that indicates a condition under which the operation right transfers among the plurality of operation modes to one another, and granting the operation right to the next operation mode determined by the operation right granter, wherein the plurality of operation modes comprises a plan operation mode, a calendar operation mode, and a manual operation mode, under the plan operation mode, charging and discharging of the storage battery are controlled based on a charge/discharge plan preliminarily set by a user among a plurality of charge/discharge plans, under the calendar operation mode, charging and discharging of the storage battery are controlled based on an event and a start time of the event that are pre-recorded by the user using a calendar recording function, and under the manual operation mode, charging and discharging of the storage battery are controlled by an operation by the user for commanding starting or stopping of the charging of the storage battery or starting or stopping of the discharging of the storage battery.

13. The energy management controller according to claim 1, further comprising a transition table stored in data memory connected to the charge/discharge controller and the operation right granter via a bus, and the operation right granter is configured to transition the operation right according to the transition table.

14. The energy management controller according to claim 5, further comprising
  a transition table stored in data memory connected to the charge/discharge controller via a bus, and
  the charge/discharge controller is configured to transition the operation right according to the transition table.

15. The energy management system according to claim 8, wherein the energy management controller further comprises
  a transition table stored in data memory connected to the charge/discharge controller and the operation right granter via a bus, and
  the operation right granter is configured to transition the operation right according to the transition table.

16. The charging and discharging control method according to claim 11, wherein
  the determining of the next operation mode occurs according to a transition table stored in data memory of the energy management controller.

17. The non-transitory computer-readable recording medium according to claim 12, further comprising:
  a transition table, and
  the operation right granter is configured to transition the operation right according to the transition table.

* * * * *